United States Patent
Sapy et al.

[15] 3,653,689
[45] Apr. 4, 1972

[54] RELEASABLE COUPLING FOR FLUID CARRYING TUBES

[72] Inventors: Jacques Sapy, Valence; Andre Legris, St-Maur, both of France

[73] Assignee: Ste. Legris, Ozoir-la-Ferriere, France

[22] Filed: May 6, 1970

[21] Appl. No.: 35,215

[30] Foreign Application Priority Data

May 3, 1969 France..................................6917467

[52] U.S. Cl..............................285/113, 285/308, 285/322
[51] Int. Cl.........................................................F16l 17/00
[58] Field of Search..................285/308, 105, 315, 322, 323, 285/343, 113

[56] References Cited

UNITED STATES PATENTS

| | | | |
|---|---|---|---|
| 2,478,127 | 8/1949 | Parker | 285/113 X |
| 3,214,200 | 10/1965 | Carlson et al. | 285/323 |
| 3,454,290 | 7/1969 | Tairraz | 285/323 X |

FOREIGN PATENTS OR APPLICATIONS

| | | | |
|---|---|---|---|
| 663,255 | 12/1951 | Great Britain | 285/113 |
| 970,887 | 9/1964 | Great Britain | 285/323 |

Primary Examiner—Andrew V. Kundrat
Attorney—John Lezdey

[57] ABSTRACT

A releasable coupling for a fluid-carrying tube comprises a socket having four stepped concentric bores, a collar having a conical surface being retained in the first bore. Mounted for axial movement within the collar is a clamping member having a plurality of flexible jaws. The clamping member has an inclined surface co-operating with the conical surface on the collar to force the jaws inwardly to clamp a tube received in the socket. A packing ring is retained in the second bore, and the third and fourth bores serve to locate the tube.

10 Claims, 28 Drawing Figures

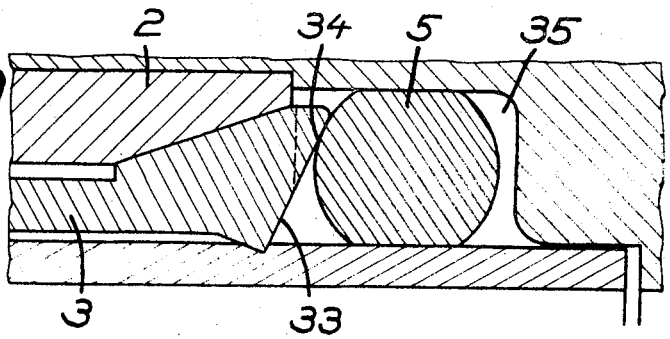
FIG. 20
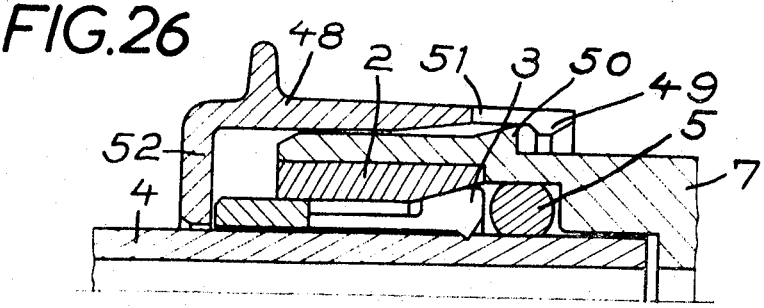
FIG. 26
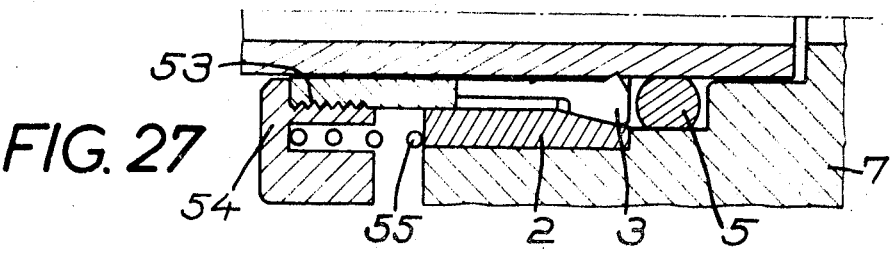
FIG. 27
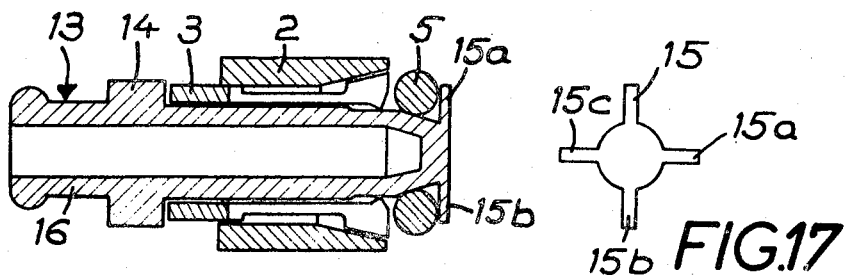
FIG. 16
FIG. 17

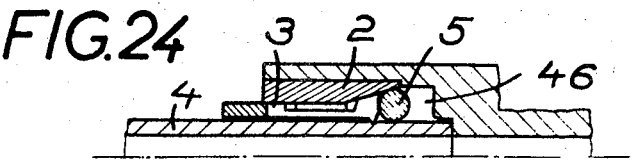
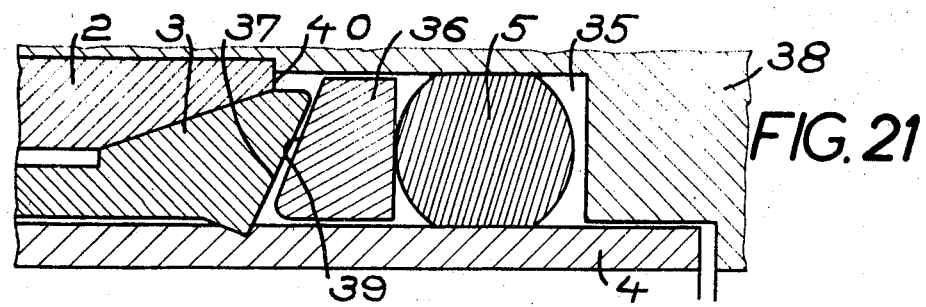
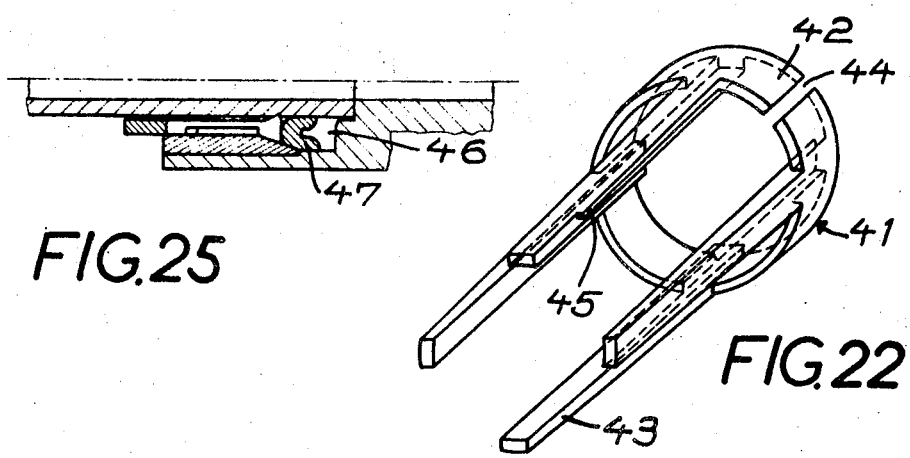
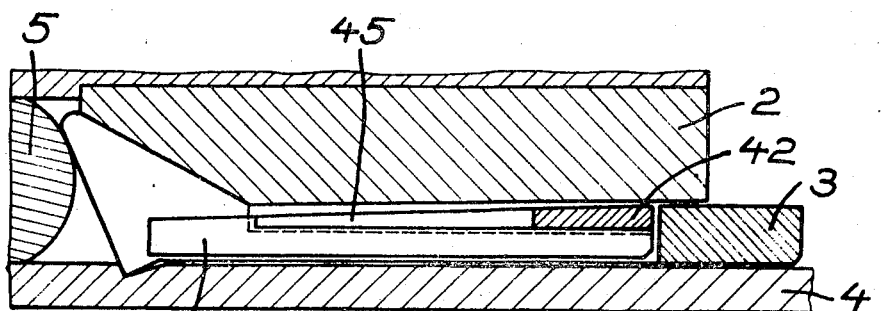

3,653,689

RELEASABLE COUPLING FOR FLUID CARRYING TUBES

FIELD OF THE INVENTION

The present invention relates to a releasable coupling for a fluid-carrying tube, with particular reference to the connection of semi-rigid plastic tubing to automatic air-control components.

SUMMARY OF THE INVENTION

According to the invention there is provided a releasable coupling for a fluid-carrying tube comprising a socket having first, second, third, and fourth concentric bores, a collar retained in said first bore, means within said socket defining a surface inclined to the axis of said bores, and means movable with said tube and co-operating with said inclined surface to clamp said tube upon movement of said tube relative to said bores, said third and fourth bores serving to locate said tube in said socket.

Further according to the invention there is provided a releasable coupling for a fluid-carrying tube, said coupling comprising means defining first, second, third, and fourth stepped concentric bores a collar retained in said first bore and having an inner surface inclined to the axis of said bore, a clamping member mounted within said collar for axial movement relative thereto and having a bore slightly larger than the diameter of the tube, said clamping member comprising a plurality of flexible jaws and means on said jaws co-operating with said inclined surface to drive said jaws inwardly upon relative movement between said collar and said jaws to clamp said tube, and a packing ring retained in said second bore to provide a seal between the outer surface of the tube and wall of said second bore, said third and fourth bores serving to locate said tube.

Still further according to the invention there is provided an assembly comprising a socket having a bore, means is said bore defining a surface inclined to the axis of said bore, a tube inserted into said bore, locking means movable relative to said bore and interposed between a wall of said bore and the outer surface of said tube, the said inclined surface being inclined to the axis of said bore in a sense to cause wedging of said locking means between said inclined surface and the outer surface of said tube upon movement of said tube in a sense to remove said tube from said socket, and means selectively preventing movement of said locking means along said inclined surface.

BRIEF DESCRIPTION OF THE DRAWINGS

Embodiments of the invention will now be described by way of example only with reference to the accompanying diagrammatic drawings, in which:

FIG. 16 is a longitudinal section of an assembly tool;

FIG. 17 is an end elevation of the tool shown in FIG. 16;

FIG. 20 is a fragmentary longitudinal section showing a clamping member in contact with a packing ring;

FIG. 21 is a fragmentary longitudinal section of a 10th embodiment;

FIG. 22 is a perspective view of a restraining member for a clamping member;

FIG. 23 is a fragmentary longitudinal section shwoing the restraining member illustrated in FIG. 22 fitted on a clamping member;

FIG. 24 is a fragmentary longitudinal section of a coupling connector having a freely movable packing ring;

FIG. 25 is a fragmentary longitudinal section of a coupling having lipped packing ring;

FIG. 26 is a fragmentary longitudinal section of a coupling having one form of means for moving the clamping member; and FIG. 27 is a fragmentary longitudinal section of a coupling having another form of means for moving the clamping member.

DESCRIPTION OF THE PREFERRED EMBODIMENTS

Figure 1:
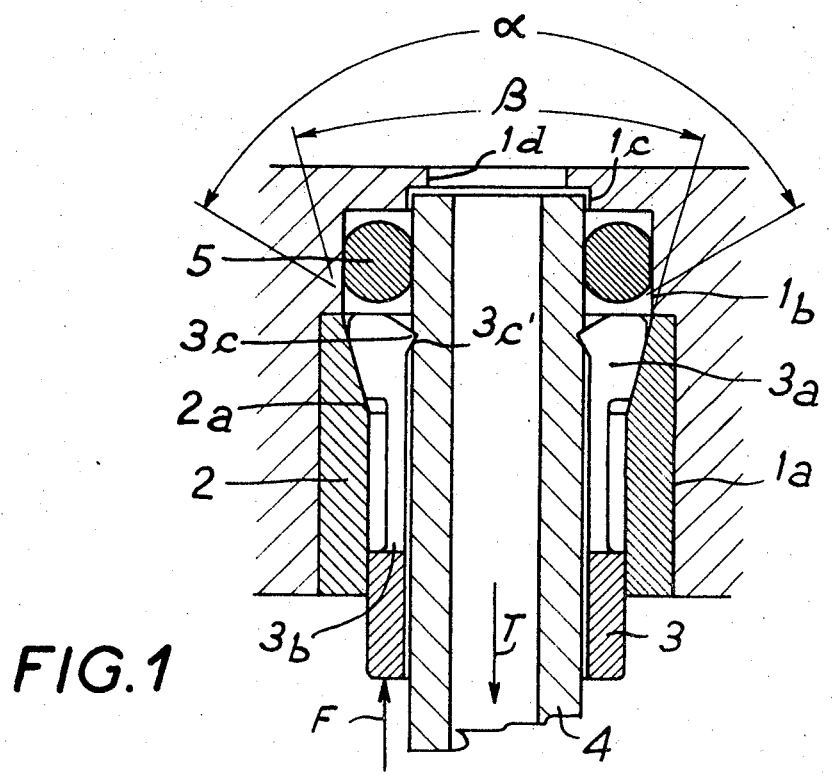
FIG. 1 is a longitudinal section of one embodiment of a coupling in accordance with the invention.

In the coupling shown in FIG. 1 a socket formed in a wall 1, of a pneumatic distribution component comprises four concentric stepped bores $1a$, $1b$, $1c$ and $1d$, which can be produced by a single machining operation or in a mould requiring no special release technique.

A clamping member 3, having a conical outer face comprises four flexible jaws $3a$, which can be closed radially by the combined action of the conical face and the divergent portion $2a$ of a collar 2, which is driven or screwed into the bore $1a$. Each of the jaws $3a$ has a portion $3b$, of reduced cross-section, to increase its flexibility, and a circular, sharp-angled knife edged portion $3c$, arranged to bite into the periphery of a semi-rigid plastic tube 4.

To establish connection, the tube 4 is simply inserted into the clamping member 3, the jaws $3a$ of which are opened out by the slight thrust required to force the tube 4 home against the bottom of the bore $1c$ after clearing an elastomeric packing ring 5 housed within the bore $1b$. Then, if the tube is pulled in the direction T or the tube is pressurized, the radial force due to the conical configuration of the outer face of the member 3 will cause the jaws $3a$ to tighten and the greater the force applied to the tube 4 in the direction T the firmer will be the anchorage provided by the knife edged portion $3c$. To disconnect the tube 4 an axial thrust is applied to the lower end of the clamping member 3 in the direction F, whilst the tube 4 is withdrawn in the direction T.

For the jaws $3a$ of the gripper to be able to grip the tube effectively in response to a force applied in the direction T, the angle $\alpha$ subtended between the upper faces of the portions $3c$ should be greater than the angle $\beta$ subtended by the conical outer face of the member 3. Maximum effectiveness of the connection is achieved when $\alpha$ is approximately equal to $4\beta$ and when $\beta$ lies between 20° and 40°.

Figure 2:
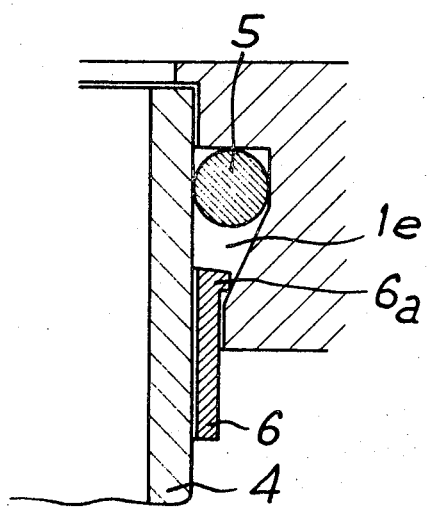
FIG. 2 is a fragmentary longitudinal section of a second embodiment.

A simplified form of coupling for use in relatively low-pressure systems is shown in FIG. 2. In this embodiment, the packing ring 5 serves not only to make the connection leakproof, but also to retain the tube 4 by adhesion. The socket comprises a cavity $1e$, having a conical portion and a cylindrical portion to accommodate the packing ring 5, and two stepped bores for positioning the tube 4. A bush 6, which is capable of elastic deformation and which is split along one position of its generator line to enable an integral shoulder $6a$ to be introduced into the cavity $1e$, can be moved towards the packing ring, to prevent the tube from jamming when it is desired to break the connection.

In both the foregoing embodiments, it will be apparent that connection and disconnection can be carried out without the use of tools and without the need to prepare the tube or apply any fittings to it.

Figure 4:
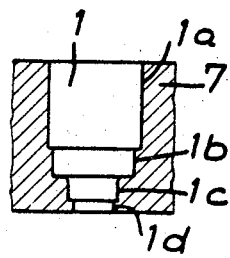
FIG. 4 is a longitudinal section of a socket used in the third embodiment.
Figure 3:
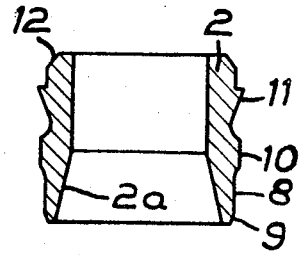
FIG. 3 is a longitudinal section of a collar used in a third embodiment.

FIG. 3 shows a modified form of collar 2, the interior of which has a divergent portion 2a. This collar is intended to be fitted into a socket 1 in a body 7 (FIG. 4), the socket 1 comprising stepped bores 1a, 1b, 1c and 1d.

The outer surface of the collar 2 has a cylindrical guide portion 8 for fitting into the socket 1; a chamfered end portion 9; a second cylindrical portion 10, having a larger diameter than the portion 8 to be force-fitted into the bore 1a; a third portion 11, which is conical and defines a sharp tooth-edged projection; and a chamfered rim 12 for setting the collar when it is in position in the socket 1.

Figure 5:
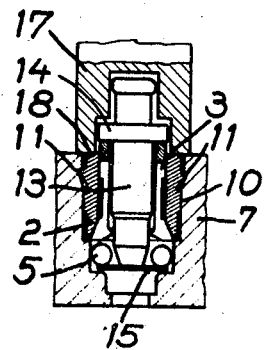
FIG. 5 is a longitudinal section of the third embodiment, the socket being formed in a plastic body.
Figure 6:
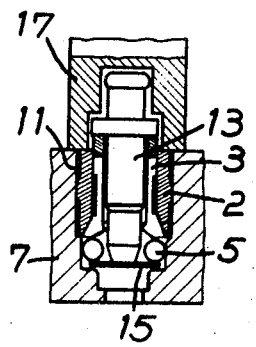
FIG. 6 is a longitudinal section of the third embodiment the socket being formed in a metal body.

To assemble the connector, as is shown more particularly in FIGS. 5 and 6, the clamping member 3, collar 2 and sealing ring 5 are mounted on a tubular mandrel 13.

Adjacent to one end of the mandrel 13 is a flange 14 which is slightly larger is diameter than the clamping member 3. The flange 14 serves as a stop for the collar 2, which is thereby retained on the mandrel. The other end portion of the mandrel (as shown in FIGS. 16 and 17) carries claws, 15, 15a, 15b and 15c which, like the remainder of the mandrel are made of a relatively flexible material, to enable them to be deformed and manually inserted through the clamping member, collar, and sealing ring, so as to retain these parts on the mandrel.

At its flanged end, the mandrel has an extension piece 16 to facilitate handling.

The mandrel 13 enables the various parts to be properly centred, as shown in FIGS. 5 and 6, during assembly. The mandrel together with the parts retained thereon is inserted by hand into the bore 1a, and then the collar 2 is forced home by means of a tool 17, the rim 18 of which bears on the collar 2.

When the body 7 is made of a plastic material, the tooth-edged projection of the collar 2 bites into the body and the cylindrical portion 10 forms a force fit in the bore (as shown in FIG. 5).

When the body 7 is made of a metallic material (as shown in FIG. 6), the conical portion 11 is turned over within the bore 1a and the cylindrical portion 10 forms a force fit in the bore. To improve the fixing, an adhesive can also be used.

The member 13 is then withdrawn from the socket, the claws 15, 15a, 15b and 15c yielding to enable them to pass through the ring 5 and the clamping member 3.

Alternatively, the mandrel 13 can remain in the socket to protect the connection against dust and swarf.

Figure 7:
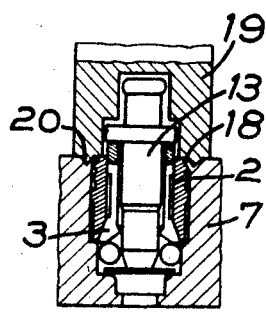
FIG. 7 is a longitudinal section of a fifth embodiment.

In an alternative form of assembly tool 19, illustrated in FIG. 7, the working face of the tool carries a sharp ridge or knife edge 20, triangular in section, to set the collar 2 in place by upsetting the material of the body 7, that is to say the solid metal, surrounding the socket 1.

Figure 9:
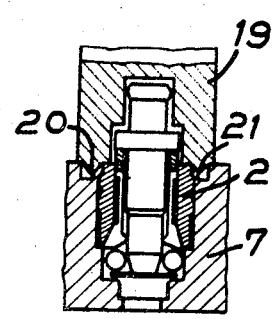
FIG. 9 is a longitudinal section of the sixth embodiment.
Figure 8:
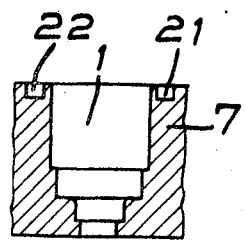
FIG. 8 is a longitudinal section of a socket used in a sixth embodiment.

The body 7 shown in FIG. 8 has a circular groove 21 formed around the socket 1 to define a rim 22 which is subsequently turned over on to the chamfered portion 12 of the collar 2 (FIG. 9) to form a setting for the latter.

Figure 11:
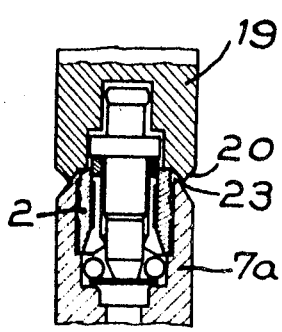
FIG. 11 is a longitudinal section of the seventh embodiment.
Figure 10:
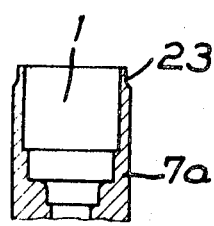
FIG. 10 is a longitudinal section of a socket used in a seventh embodiment.

Finally, in the case of a body 7a produced in a lathe, the socket 1 is provided with a machined rim 23 (FIG. 10) which is turned over on to the collar 2 by means of a tool 19 (FIG. 11) having a triangular-sectioned knife edge 20.

In the constructions described so far, the collar 2 is force-fitted into the socket 1. It is equally possible, however, for the collar to be fitted freely by hand and to have its rim set in afterwards. The socket 1 shown in FIG. 12 is arranged for this type of fitting, the bore 1a being replaced by three bores, 24a, 24b and 24c, proportioned to allow the portions 8, 10 and 11 of the collar 2 to pass freely therethrough.

Figure 13:
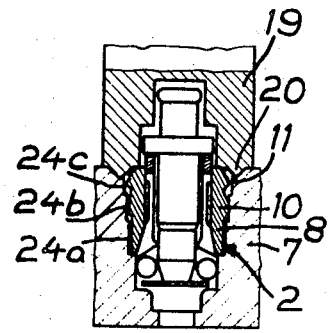
FIG. 13 is a longitudinal section of the eighth embodiment.
Figure 15:
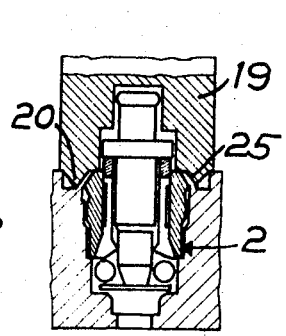
FIG. 15 is a longitudinal section of the ninth embodiment.

As shown in FIG. 13, the working face of a tool 19 has a sharp knife edge 20 to enable the collar 2 to be set in place by upsetting the metallic material of the body 7.

Figure 12:
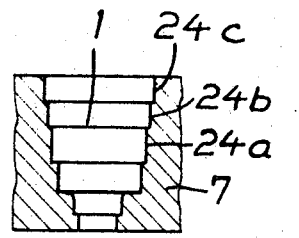
FIG. 12 is a longitudinal section of a socket used in an eighth embodiment.
Figure 14:
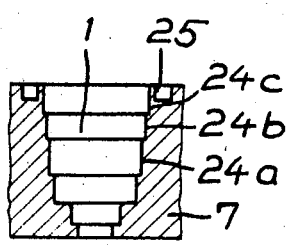
FIG. 14 is a longitudinal section of a socket used in a ninth embodiment.

The construction shown in FIG. 14 is similar to that shown in FIG. 12, except that a circular groove is formed around the socket 1 to define a rim 25, which is turned over by the knife edge 20 of the tool 19 on to the outer edge of the collar.

Figure 18:
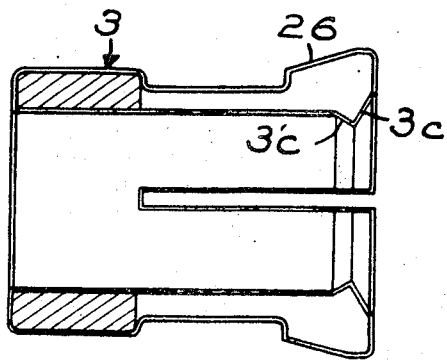
FIG. 18 is a longitudinal section of one form of clamping member.

The clamping member 3 can be made not only from a metallic material but also of moulded plastic, as illustrated in FIG. 18, in which the member 3 is covered with a layer of metal 26 for example chromium, having a sufficient strength to compensate for the softness of the plastic material and to enable the teeth defined by lips 3c/3c' to bit into the plastic tube 4. This arrangement is advantageous in that the surrounding layer of metal 26 reinforces the member 3 as a whole, and imparts flexibility thereto. During deformation of the member 3 the layer of metal, which is under tension, resists and greatly increases the rigidity of the member 3 which can thus be used in the same way as if it were made purely from a metallic material.

Figure 19A:
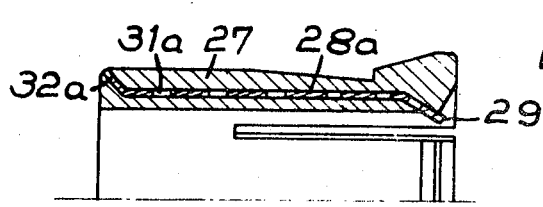
FIGS. 19a and 19b are fragmentary longitudinal sections of further forms of clamping members.
Figure 19B:
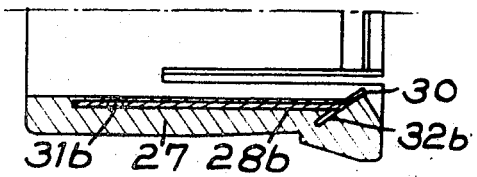

Illustrated in FIGS. 19a and 19b is a clamping member 27, made of plastic material and reinforced internally by spring-steel strips 28a and 28b respectively. In each case the strips 28a and 28b have inclined portions 29 and 30 respectively, defining lips by which the member 27 is attached to the tube 4.

The strips 28a and 28b are provided with apertures 31a and 31b and tongues 32a and 32b to improve their adhesion to the moulded material of the member 27.

In the clamping member 3, shown in FIG. 20, the outer face 33 of the anchoring knife edge is extended at 34 to form an inclined face which bears against the packing ring 5 during disconnection of the tube 4 to thrust the packing ring 5 towards the rear of its housing, so as to fill the space 35. When the member 3 is slightly released, the pressure on the packing 5 is sufficient to release it further to permit withdrawal of the tube 4.

In the coupling shown in FIG. 21 use is made of a washer 36 to protect the packing ring 5. The washer 36 is interposed between the knife-edged portion of the member 3 and the packing ring and slides freely within the body 38 and is a loose fit round the tube 4.

The washer 36 transmits the whole amount of any force exerted by the packing ring 5 to the member 3 and brings about a degree of tightening of the member 3 which is proportionate to the pressure on the tube 4. To limit the amount of such tightening to avoid damaging the tube, the washer 36 acts as a stop as soon as its face 39 encounters a part 40 of the collar 2.

Again the washer 36 facilitates the fitting of the tube 4 by presenting to the member 3 a smooth conical face 39, against which a face 37 of the member 3 comes to bear when the member 3 has been pushed fully home thus releasing the member 3.

FIGS. 22 and 23 show a component 41 which limits the degree of closure of the member 3 to avoid damage to the tube 4 when an excessive pull is exerted on the tube 4.

The component is formed from a hard resilient material and comprises a ring, 42, split at 44 and having arms 43 for insertion into corresponding slots in the member 3 (FIG. 23). To prevent the restraining member 41 from moving forwards along the member 3, at least one of the arms 43 includes a tongue 45 which extends longitudinally over the member 3. Should excessive thrust be exerted on the packing ring 5 or too heavy a pull be applied to the tube 4, the closure of the slots in the member 3 is limited by the arms 43.

FIGS. 24 and 25 show further methods of fitting the packing ring 5, which in this case is loose within the space 46. The ring 5 (FIG. 24) is compressed between the tube 4 and the conical surface of the collar 2. In this way, the release of the member 3 is facilitated, since the packing ring 5 is not held fast, but is free to move back into the space 46.

As shown in FIG. 25, the packing ring is in the form of a double-lipped ring 47, which is more flexible than the ring 5.

In further forms of construction, illustrated in FIGS. 26 and 27, the coupling includes a thrust member to facilitate release of the member 3. As shown in FIG. 26, the coupling comprises thrust member 48, in the form of a cap, one end portion of which carries a circular projection 49, which acts as a stop in conjunction with a circular ridge 50 on the body 7. Slots 51 in the projection 49 enable the projection 49 to be fitted over the ridge 50. The other end portion of the member 48 has a shoulder 52, that can be brought to bear against the member 3 so as to release the member 3.

As shown in FIG. 27 one end portion of the member 3 has a threaded portion 53 on to which is screwed a thrust member 54 biassed by a spring 55, which bears against the collar 2 or body 7 of the connector.

The couplings described enable connections to be effected between sockets and tubes in miniaturised pneumatic control systems without the need to specially prepare the tube for the connection. The couplings are relatively simple, inexpensive to produce, and have relatively small radial dimensions, which are advantageous in relatively complex circuits, in which it is desirable to be able to make connections very close together.

What is claimed is:

1. A releasable coupling for a fluid-carrying tube, said coupling comprising means defining first, second, third, and fourth stepped concentric bores, a collar retained in said first bore and having an inner surface inclined to the axis of said bore, a clamping member mounted within said collar for axial movement relative thereto and having a bore slightly larger than the diameter of the tube, said clamping member comprising a plurality of flexible jaws and means on said jaws co-operating with the said inclined surface to drive said jaws inwardly upon relative movement between said collar and said jaws to clamp said tube, and a packing ring retained in said second bore to provide a seal between the outer surface of the tube and the wall of said second bore, said third and fourth bores serving to locate said tube.

2. A coupling according to claim 1 wherein the outer surface of said collar comprises a first cylindrical portion for guiding said collar into said first bore, a second cylindrical portion behind said first cylindrical portion and having a diameter larger than the diameter of said first cylindrical portion and being a force fit within said first bore, and a sharp projection, behind said second cylindrical portion co-operating with the wall of said first bore.

3. A coupling according to claim 1 further comprising a rim provided around the entrance to said first bore, said rim being upset to retain said collar in said first bore.

4. A coupling according to claim 1 wherein the clamping member comprises moulded plastic covered with a layer of a harder material.

5. A coupling according to claim 1 wherein the clamping member comprises a spring-steel sleeve having a covering of moulded plastic, an end portion of said sleeve extending from said covering to provide a sharp edge arranged to engage the tube.

6. A coupling according to claim 5 wherein the clamping member comprises an outer surface inclined to the axis of said bores and arranged for contact by the packing ring.

7. A coupling according to claim 1 wherein the clamping member comprises an outer surface inclined to the axis of said bores, said coupling further comprising a freely movable ring member having a conical surface arranged to contact the said inclined surface of the clamping member, said ring member being interposed between said clamping member and said packing ring.

8. A coupling according to claim 1 wherein said clamping member comprises a plurality of slots, said coupling further comprising a split ring fitted around the clamping member, said split ring having a plurality of arms each engaged within a respective one of said slots, and said arms including tongues which extend longitudinally over said clamping member.

9. A coupling according to claim 1 further comprising abutment means slidable axially relative to said bores, said abutment means being arranged for abutting engagement with said clamping member, and stop means for limiting axial movement of said abutment means relative to said bores.

10. A releasable coupling according to claim 1 further comprising resilient means biassing said clamping member axially relative to said collar in a direction to drive said flexible jaws inwardly.

* * * * *

UNITED STATES PATENT OFFICE
CERTIFICATE OF CORRECTION

Patent No. 3,653,689     Dated April 4, 1972

Inventor(s) Jacques Sapy et al

It is certified that error appears in the above-identified patent and that said Letters Patent are hereby corrected as shown below:

On the cover sheet [30] "May 3, 1969" should read -- May 23, 1969 --, and the following priority inserted -- Feb. 26, 1970   France..............7007029 --.

Signed and sealed this 19th day of December 1972.

(SEAL)
Attest:

EDWARD M. FLETCHER, JR.
Attesting Officer

ROBERT GOTTSCHALK
Commissioner of Patents